(12) United States Patent
Emuchay et al.

(10) Patent No.: US 9,632,817 B2
(45) Date of Patent: Apr. 25, 2017

(54) CORRELATING BUSINESS WORKFLOWS WITH TRANSACTION TRACKING

(75) Inventors: Nduwuisi Emuchay, Austin, TX (US); Jean X Yu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3750 days.

(21) Appl. No.: 11/193,840

(22) Filed: Jul. 29, 2005

(65) Prior Publication Data
US 2007/0027742 A1    Feb. 1, 2007

(51) Int. Cl.
| | |
|---|---|
| *G06Q 10/06* | (2012.01) |
| *G06Q 30/02* | (2012.01) |
| *G06Q 30/06* | (2012.01) |
| *G06Q 10/08* | (2012.01) |
| *G06F 9/46* | (2006.01) |
| *G06Q 40/00* | (2012.01) |
| *G06F 11/34* | (2006.01) |

(52) U.S. Cl.
CPC ............. *G06F 9/466* (2013.01); *G06Q 10/06* (2013.01); *G06Q 10/0633* (2013.01); *G06Q 40/00* (2013.01); *G06F 11/3466* (2013.01); *G06F 2201/87* (2013.01)

(58) Field of Classification Search
CPC ............................... G06Q 10/06; G06Q 40/00
USPC ............................................ 705/1, 1.1–912
See application file for complete search history.

(56) References Cited

U.S. PATENT DOCUMENTS

| | | | |
|---|---|---|---|
| 6,252,519 B1 | 6/2001 | McKenna | |
| 6,389,340 B1 | 5/2002 | Rayner | |
| 6,548,997 B1 | 4/2003 | Bronfer et al. | |
| 6,765,495 B1 | 7/2004 | Dunning et al. | |
| 7,102,496 B1 | 9/2006 | Ernst et al. | |
| 7,437,734 B2 * | 10/2008 | Rees et al. | ..... 719/316 |
| 7,568,023 B2 | 7/2009 | Green et al. | |
| 2002/0082919 A1 | 6/2002 | Landau et al. | |
| 2002/0173997 A1 | 11/2002 | Menard et al. | |
| 2003/0120593 A1 * | 6/2003 | Bansal et al. | ..... 705/39 |
| 2004/0225546 A1 | 11/2004 | Oberdorfer et al. | |

(Continued)

OTHER PUBLICATIONS

USPTO Notice of Allowance for U.S. Appl. No. 12/173,430 dated Jul. 26, 2010.

(Continued)

*Primary Examiner* — Jonathan Ouellette
(74) *Attorney, Agent, or Firm* — Yee & Associates, P.C.; Richard A. Wilhelm (57) ABSTRACT

Methods, systems, and products are disclosed for correlating business workflows with transaction tracking, the method including identifying an instrumentation point in a business process of a business workflow that invokes an IT resource that carries out at least a portion of the business process and associating, at the instrumentation point, the business process and the IT resource with a transaction name having business semantics such that correlation data gathered about the IT resource may be linked with the business process. Correlating business workflows with transaction tracking may also include gathering correlation data about the IT resource, selecting one of the plurality of service specific correlator passing methods, and passing a correlator in accordance with the selected service specific correlator passing methods.

16 Claims, 8 Drawing Sheets

(56) References Cited

U.S. PATENT DOCUMENTS

| | | |
|---|---|---|
| 2005/0222931 A1* | 10/2005 | Mamou et al. ................ 705/35 |
| 2006/0168594 A1 | 7/2006 | Deverill et al. |
| 2006/0206882 A1 | 9/2006 | Illowsky et al. |
| 2006/0233105 A1 | 10/2006 | Rapp |
| 2006/0241954 A1 | 10/2006 | Jeng et al. |
| 2006/0248016 A1 | 11/2006 | Ginter et al. |
| 2008/0098108 A1 | 4/2008 | Yu |

OTHER PUBLICATIONS

USPTO office action for U.S. Appl. No. 11/550,858 dated Nov. 2, 2009.
USPTO office action for U.S. Appl. No. 11/550,858 dated Apr. 21, 2009.

\* cited by examiner

CORRELATING BUSINESS WORKFLOWS WITH TRANSACTION TRACKING

BACKGROUND OF THE INVENTION

Field of the Invention

The field of the invention is data processing, or, more specifically, methods, systems, and products for correlating business workflows with transaction tracking.

Description Of Related Art

Service-Oriented Architecture ('SOA') is a business integration application architecture for running business processes that invoke information technology ('IT') resources in a distributed processing environment. Such business processes are typically written in a business processing language such as the Business Process Execution Language ('BPEL'). Such business processing languages are typically used to abstract the execution of the business process from actual IT resources called by the process. IT resources are downstream computer resources available to a business process. Examples of such IT resources are web services, Enterprise Java Beans ('EJBs') running on an EJB server, databases, Java services, and other computer resources that will occur to those of skill in the art.

In typical SOA implementations, all information technology ('IT') functions, or services, are defined using a business process description language. SOAs also have invocable interfaces that are called to perform business processes. SOA enables building a web-services-based layer of abstraction over legacy systems and outside services and subsequently leveraging the legacy systems and outside services to assemble business processes. The legacy systems and outside services leveraged by SOA applications often heterogeneous applications and technologies. A typical SOA application may contain a business process and downstream IT transactions invoked by the business process.

Transaction tracking tools are widely used to track transactions typically occurring in a distributed computing environment. Transaction tracking is carried out by passing a correlator at an instrumentation point and gathering data about the transaction with the passing of the correlator. An instrumentation point is a call to a transaction tracking tool to begin gathering information about the transaction. Management software is typically then used to display information gathered at the instrumentation points about the transactions.

One specific transaction monitoring application programming interface ('API') is the Application Response Measurement ('ARM') API. ARM is an industry standard for tracking the performance of programs. ARM commands include commands in Java or C to initiate an application, to create a transaction ID, to start and stop monitoring transactions, and to end all monitoring. ARM provides for correlating the information of transactions by passing a data structure called a correlator from a parent transaction to a child transaction. ARM uses the data to create a data structure that represents the relationships of the transactions being monitored. The data produced by the ARM API can be collected by management software for use in displaying information about the transactions monitored.

Traditional tracking tools, such as for example ARM, are not, however, fully utilized in correlating the business processes with the IT transactions that carry out the business process because there is little or no correlation between the downstream IT resources that carry out business processes and the business processes themselves. IT transactions are instead tracked separately as transactions unrelated to the business process they support. This provides no linking in the transaction tracking of the IT resources and the transaction tracking of the business process they support.

Two methods for attempting to extend the IT tracking to business processes currently exist. One method of extending IT tracking to business processes includes inserting artificial business process artifacts into business processes. These artificial artifacts carry on the tasks of the instrumentation and correlation of transactions typically carried out by ARM or other transaction tracking tools. In order to gather performance data with this method, business process modelers insert business method specific monitoring calls as business artifacts immediately before and after each actual business activity. This insertion of artificial artifacts in the business processes works only for uninterruptible workflows with synchronized request/response activities executed locally on a single machine. In other words, this conventional method cannot handle long-running processes such as asynchronous activities in distributed environment. The method fails because implementation specific object instances are not accessible at the business process level. Therefore, data structures to be used to convey correlations between transactions cannot be carried to different execution threads or to remote machines. That is, the underlying IT transactions carrying out the business methods cannot be tracked using this method. Further, this method requires business process modelers to add artificial business process artifacts around every business process in every business process script for which transaction tracking is desired. In many cases, this insertion of artificial processes is cumbersome.

A second method for attempting to extend transaction tracking to business processes provides for automating audit event callbacks that are accessible through an engine that implements business processes ('business process engine'). Business process activities are then correlated with the event data produced by the callbacks. This method, however, does not enable end-to-end business transaction correlation because audit event callbacks are designed to provide aggregate information about activities of business processes, not IT resources. In order to activate the audit events, a business process modeler must modify every existing business process workflow to add a flag in each activity of every business process. In many cases, adding the flag at each activity is cumbersome.

SUMMARY OF THE INVENTION

Methods, systems, and products are disclosed for correlating business workflows with transaction tracking in a distributed computing environment, the method including providing a means to identify an instrumentation point in a business process of a business workflow that invokes an IT resource that carries out at least a portion of the business process and associating, at the instrumentation point, the business process and the IT resource with a transaction name having business semantics such that correlation data gathered about the IT resource may be linked with the business process. Correlating business workflows with transaction tracking may also include gathering correlation data about the IT resource, selecting one of the plurality of service specific correlator passing methods, and passing a correlator in accordance with the selected service specific correlator passing methods.

Providing a means to identify an instrumentation point may be carried out by providing a means to select a new instrumentation point in a business process. Associating the business process and the IT resource may be carried out by naming a transaction with a transaction name having business semantics. Providing a means to identify an instrumentation point may be carried out by providing a means to select an existing instrumentation point in a business process. Associating the business process and the IT resource may be carried out by renaming a transaction with a transaction name having business semantics.

The instrumentation point in a business process of a business workflow that invokes an IT resource that carries out at least a portion of the business process may be an instrumentation point in a Web Service Invocation Framework ('WSIF') client associated with an invocation interface.

Correlating business workflows with transaction tracking may also include providing to a user through a user interface correlation data for the IT resource in association with a name having business semantics and providing to a user through a user interface correlation data for the IT resource in association with a name having semantics for the IT resource.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Correlating Business Workflows With Transaction Tracking

Exemplary methods, systems, and products for correlating business workflows with transaction tracking according to embodiments of the present invention are described with reference to the accompanying drawings, beginning with FIG. 1. Transaction tracking according to embodiments of the present invention is typically implemented in a distributed computing environment in which IT resources carry out one or more portions of a business process.

Figure 1:
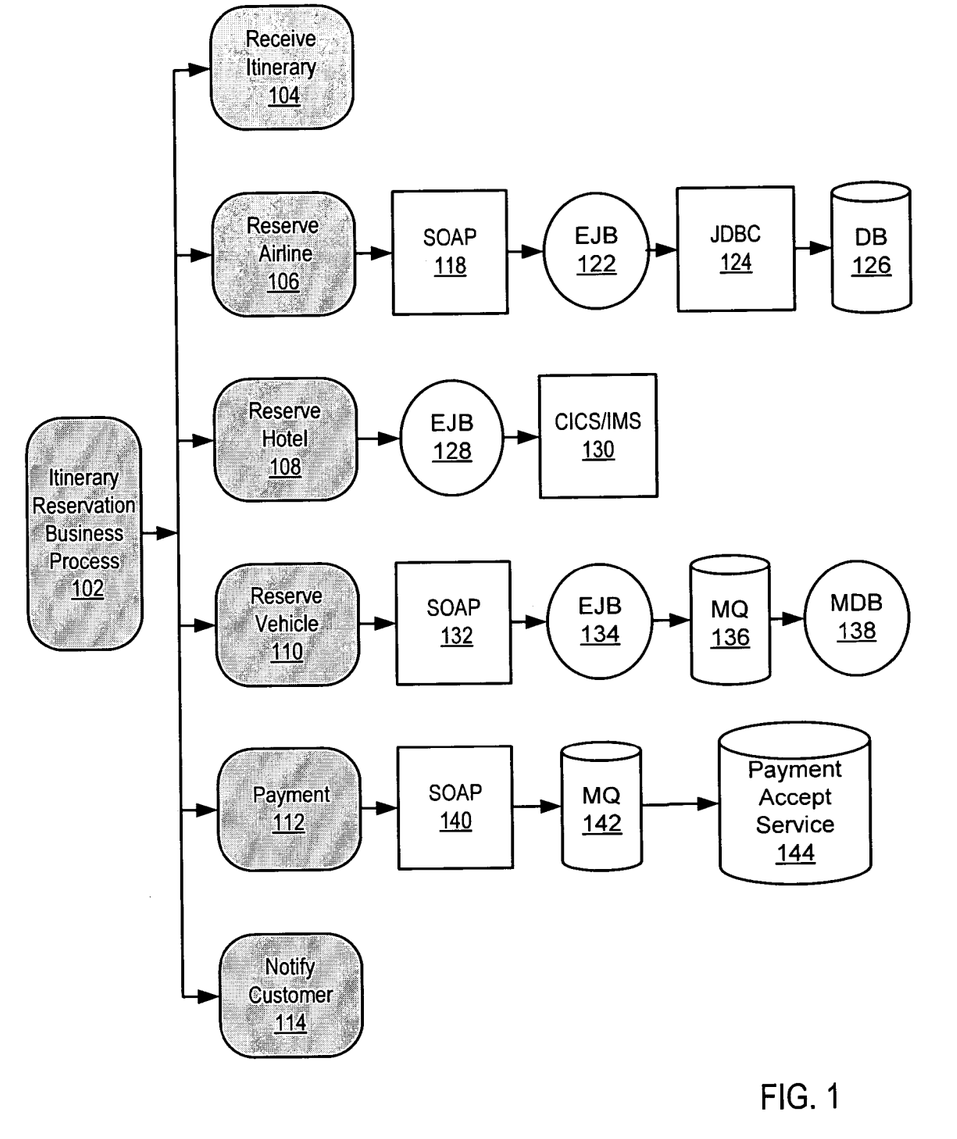
FIG. 1 sets forth a process flow chart illustrating an exemplary system for correlating business workflows with transaction tracking according to embodiments of the present invention.

FIG. 1 sets forth a process flow chart illustrating an exemplary system for correlating business workflows with transaction tracking according to embodiments of the present invention. A business workflow is an aggregation of business processes or subprocesses typically written in a business processing language such as, for example, the Business Process Execution Language ('BPEL'). Business workflows also typically include both the processes or subprocesses that implement the business workflow, as well as their relationship with one another. The business processes and business subprocess also typically include one or more business activities, such as for example BPEL activities, that are used to carry out a business workflow.

FIG. 1 illustrates an exemplary itinerary reservation business process (102), representing the overall business of the travel agency. Itinerary reservation business process (102) includes a plurality of subprocesses (104, 106, 108, 110, 112, and 114) which carry out subprocesses in providing itinerary reservation service to a customer of a travel agency. The subprocesses include receive itinerary (104), reserve airline (106), reserve hotel (108), reserve vehicle (110), payment process (112), and notify customer (114). The subprocesses of FIG. 1 are business subprocess running in a business process engine. Business subprocess, such as those in the example of FIG. 1, are typically written in a business processing language such as the Business Process Execution Language ('BPEL'). Such business processing languages are typically used to abstract the execution of the subprocesses of the business workflow from actual IT resources called by the subprocesses that carry out the execution of the workflow itself.

As just discussed, the business subprocesses (104, 106, 108, 110, 112, and 114) of FIG. 1 are carried out by executing IT artifacts. In the example of FIG. 1 the reserve airline (106) subprocess reserves an airline flight for a user through a request (118) in the Simple Object Access Protocol ('SOAP'), the standard protocol for web service requests and responses. The SOAP request (118) is received by an Enterprise JavaBeans™ (122) ('EJB') component. An EJB is a business component of a J2EE application that runs on the J2EE server. In the example of FIG. 1, the EJB (122) continues to carry out the reserve airline subprocess by calling a Java Database Connectivity (124) ('JDBC') application programming interface to retrieve data from a data base (126). JDBC provides a standard interface between Java platforms and databases.

In the example of FIG. 1, the reserve hotel (108) subprocess reserves a hotel for a user by calling a method in an EJB component (128), which in turn calls on Customer Information Control System/Information Management System (130) ('CICS/IMS') to make a hotel reservation for the user. CICS is an IBM transaction processing system which controls the interaction between applications and users. IMS is a hierarchical database management system. CICS and IMS are often used together as the front end and back end of a database application.

In the example of FIG. 1, the reserve vehicle (110) subprocess reserves a vehicle for the user by sending a SOAP request (132) to an EJB (134) running on an EJB server who in turn submits a message through Message Queuing (136) ('MQ') queue to a Microsoft Data Base (138)

('MDB') to make a reservation for the user. MDB databases are files produced a variety of Microsoft products. In particular, MDB is the format for Microsoft Access databases.

In the example of FIG. 1, the payment subprocess (112) accepts payment for the itinerary reservation at least in part by sending a SOAP request (140) which is then placed in an MQ (142) queue and received by a payment accept service (144).

The example of FIG. 1 illustrates an overall integrated business application with heterogeneous IT artifacts, applications, and technologies. The overall integrated business application of FIG. 1 operates generally to correlate business workflows with transaction tracking by identifying an instrumentation point in a business process of a business workflow that invokes an IT resource that carries out at least a portion of the business process and associating, at the instrumentation point, the business process and the IT resource with a transaction name having business semantics such that correlation data gathered about the IT resource may be linked with the business process.

In the example of FIG. 1, the reserve airline subprocess (106) is correlated with the IT artifacts (118, 122, 124, and 126) for transaction tracking by identifying the invoking of the EJB (122) by sending the SOAP message (118) as invoking an IT resource, selecting the invoking of the IT resource as a new instrumentation point in the business process, and naming the transaction of invoking the resource with a transaction name having business semantics such as, for example, bpel:iternaryReservation:reserveAirline:callReserveArilineEJB:nextNumber. In this example, transactions resulting from calls to the EJB are given the transaction name bpel:iternaryReservation:reserveAirline:callReserveArilineEJB:nextNumber. In this example, the phrase 'nextNumber' reserves a unique transaction identifier for the transaction, and 'bpel:iternaryReservation:reserveAirline:callReserveArilineEJB' identifies the transaction as having defined business semantics.

In the example of FIG. 1, the reserve airline subprocess (106) is correlated with the IT artifacts (122 124, and 126) for transaction tracking by identifying the invoking of the EJB (122) by sending the SOAP message (118) as invoking an IT resource, selecting an existing instrumentation point in the EJB, renaming a transaction created by invoking the EJB with a transaction name having business semantics, such as for example, bpel:iternaryReservation:reserveAirline:executeReserveArilineEJB:nextNumber. In this example, transactions resulting from executing the EJB are given the transaction name bpel:iternaryReservation:reserveAirline:execute ReserveArilineEJB:nextNumber. In this example, the phrase 'nextNumber' reserves a unique transaction identifier for the transaction, and 'bpel:iternaryReservation:reserveAirline:executelReserveArilineEJB' identifies the transaction as having defined business semantics.

In the example of FIG. 1, the reserve hotel subprocess (108) is correlated with the IT artifacts (128 and 130) for transaction tracking by identifying the invoking of the EJB (128) as invoking an IT resource, selecting the invoking of the IT resource as a new instrumentation point in the business process, and naming the transaction of invoking the resource with a transaction name having business semantics such as, for example, bpel:iternaryReservation:reserveHotel:callReserveHotelEJB:nextNumber. In this example, transactions resulting from calls to the EJB are given the transaction name bpel:iternaryReservation:reserveHotel:callReserveHotelEJB:nextNumber. In this example, the phrase 'nextNumber' reserves a unique transaction identifier for the transaction, and 'bpel:iternaryReservation:reserveHotel:callReserveHotelEJB' identifies the transaction as having defined business semantics.

In the example of FIG. 1, the reserve hotel subprocess (108) is correlated with the IT artifacts (128 and 130) for transaction tracking by identifying the invoking of the EJB (128) as invoking an IT resource, selecting an existing instrumentation point in the EJB, renaming a transaction created by invoking the EJB with a transaction name having business semantics, such as for example, bpel:iternaryReservation:reserveHotel:executeReserveHotelEJB:nextNumber. In this example, transactions resulting from executing the EJB are given the transaction name bpel:iternaryReservation:reserveHotel:execute ReserveHotelEJB:nextNumber. In this example, the phrase 'nextNumber' reserves a unique transaction identifier for the transaction, and 'bpel:iternaryReservation:reserveHotel:executelReserveHotelEJB' identifies the transaction as having defined business semantics.

In the example of FIG. 1, the reserve vehicle subprocess (110) is correlated with the IT artifacts (132, 134, 136, and 138) for transaction tracking by identifying the invoking of the EJB (134) through a SOAP request (132) as invoking an IT resource, selecting the invoking of the IT resource as a new instrumentation point in the business process, and naming the transaction of invoking the resource with a transaction name having business semantics such as, for example, bpel:iternaryReservation:reserveVehicle:callReserveVehicleEJB:nextNumber. In this example, transactions resulting from calls to the EJB are given the transaction name bpel:iternaryReservation:reserveVehicle:callReserveVehicleEJB:nextNumber. In this example, the phrase 'nextNumber' reserves a unique transaction identifier for the transaction, and 'bpel:iternaryReservation:reserveVehicle:callReserveVehicleEJB' identifies the transaction as having defined business semantics.

In the example of FIG. 1, the reserve vehicle subprocess (110) is correlated with the IT artifacts (132, 134, 136, 138) for transaction tracking by identifying the invoking of the EJB (134) as invoking an IT resource, selecting an existing instrumentation point in the EJB, renaming a transaction created by invoking the EJB with a transaction name having business semantics, such as for example, bpel:iternaryReservation:reserveVehicle:executeReserveVehicleEJB:nextNumber. In this example, transactions resulting from executing the EJB are given the transaction name bpel:iternaryReservation:reserveVehicle:executeReserveVehicleEJB:nextNumber. In this example, the phrase 'nextNumber' reserves a unique transaction identifier for the transaction, and 'bpel:iternaryReservation:reserveVehicle:executelReserveVehicleEJB' identifies the transaction as having defined business semantics.

In the example of FIG. 1, the payment subprocess (112) is correlated with the IT artifacts (140, 142, and 144) for transaction tracking by identifying the invoking of the payment accept service (144) through a SOAP request (140) queued in an MQ queue (142) as invoking an IT resource, selecting the invoking of the IT resource as a new instrumentation point in the business process, and naming the transaction of invoking the resource with a transaction name having business semantics such as, for example, bpel:iternaryReservation:payment:callPaymentAcceptService:nextNumber. In this example, transactions resulting from calls to the payment accept service (144) are given the transaction name
bpel:iternaryReservation:payment:callPaymentAcceptService:nextNumber. In this example, the phrase 'nextNumber' reserves a unique transaction identifier for the transaction, and 'bpel:iternaryReservation:payment:callpaymentAcceptService' identifies the transaction as having defined business semantics.

In the example of FIG. 1, the payment subprocess (112) is correlated with the IT artifacts (140, 142, and 144) for transaction tracking by identifying the invoking of the payment accept service (144) as invoking an IT resource, selecting an existing instrumentation point in the payment accept service, renaming a transaction created by invoking the payment accept service with a transaction name having business semantics, such as for example, bpel:iternaryReservation:payment:executePayment AcceptService:nextNumber. In this example, transactions resulting from executing the payment accept service are given the transaction name bpel:iternaryReservation:payment:executePaymentAcceptService:nextNumber. In this example, the phrase 'nextNumber' reserves a unique transaction identifier for the transaction, and 'bpel:iternaryReservation:payment:executePaymentAcceptService' identifies the transaction as having defined business semantics.

The system of FIG. 1 is useful in gathering correlation data about the IT resource that is linked with the business process. By associating the business process and the IT resource with a transaction name having business semantics, the system of FIG. 1 advantageously provides for transaction tracking linking the business processes with the IT resources that carries out the business process. As mentioned above, transaction tracking is typically carried out by passing a correlator at an instrumentation point and gathering data about the transaction with the passing of the correlator. Management software is typically then used to display information gathered at the instrumentation points about the transactions. Management software displaying information gathered at the instrumentation points of the system of FIG. 1 may advantageously display correlation data regarding transactions at the IT resources (118, 122, 124, 126, 128, 130, 132, 134, 136, 138, 140, 142, and 144) that are linked to the business subprocesses (106, 108, 110, 112, and 114) that the IT resources support because those IT transactions and business transactions are now associated through a transaction name that has business semantics.

The arrangement of business processes and IT resources making up the exemplary system illustrated in FIG. 1 are for explanation, not for limitation. Typical business processes and IT resources may invoke a variety of communications protocols, a variety of database implementations, and a variety of methods for accessing databases as will occur to those of skill in the art. The arrangement of processes and IT resources making up the exemplary integrated business application illustrated in FIG. 1 is for explanation, not for limitation.

Data processing systems useful in correlating business workflows with transaction tracking according to various embodiments of the present invention may include networked computers, servers, routers, other devices, client-server architectures, peer-to-peer architectures, and many others as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), MQ, RMI/IIOP and others as will occur to those of skill in the art. Such data processing systems may use a single network or a plurality of networks including local area networks, wide area networks, the Internet, and other networks as will occur to those of skill in the art.

Correlating business workflows with transaction tracking in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in correlating business workflows with transaction tracking according to embodiments of the present invention. The computer (152) of FIG. 2 includes at least one computer processor (156) or 'CPU' as well as random access memory (168) ('RAM') which is connected through a system bus (160) to processor (156) and to other components of the computer.

Stored in RAM (168) is a business process engine (146), computer program instructions for converting business process descriptions into calls to IT resources to carry out the business processes. Running within the business process engine is a business process (171) improved according to embodiments of the present invention to correlate business workflows with transaction tracking. The business process of FIG. 2 is improved by identifying an instrumentation point in a business process of a business workflow that invokes an IT resource that carries out at least a portion of the business process and associating, at the instrumentation point, the business process and the IT resource with a transaction name having business semantics such that correlation data gathered about the IT resource may be linked with the business process.

Also stored in RAM (168) is a Java virtual machine (150), computer program instructions for executing Java executable programs. Also stored in RAM (168) is an operating system (153). Operating systems useful in computers according to embodiments of the present invention include UNIX™, Linux™, Microsoft Windows NT™, AIX™, IBM's i5/OS™, and others as will occur to those of skill in the art. Operating system (154), business process engine (146), and Java virtual machine (150) in the example of FIG. 2 are shown in RAM (168), but many components of such software typically are stored in non-volatile memory (166) also.

Figure 2:
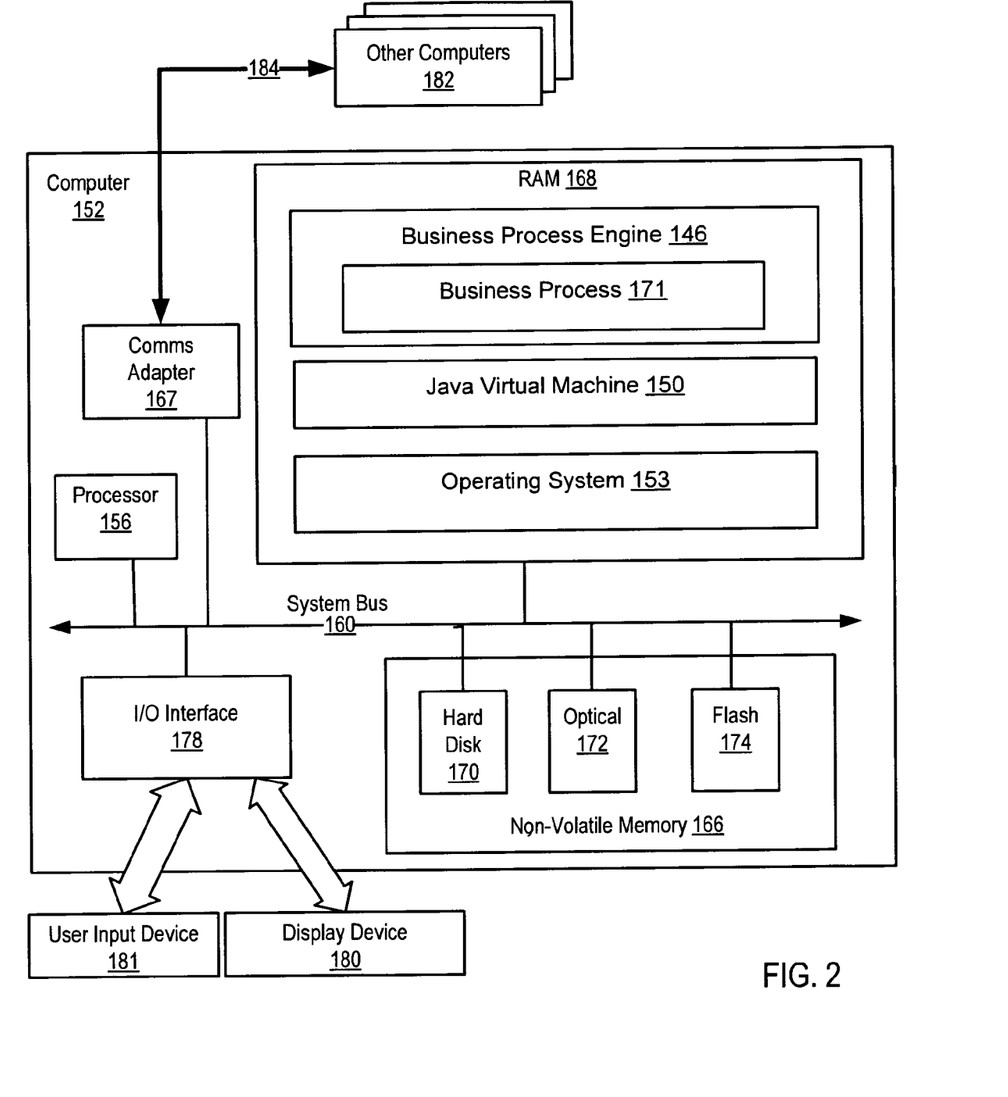
FIG. 2 sets forth a block diagram of automated computing machinery comprising an exemplary computer useful in correlating business workflows with transaction tracking according to embodiments of the present invention.

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 3:
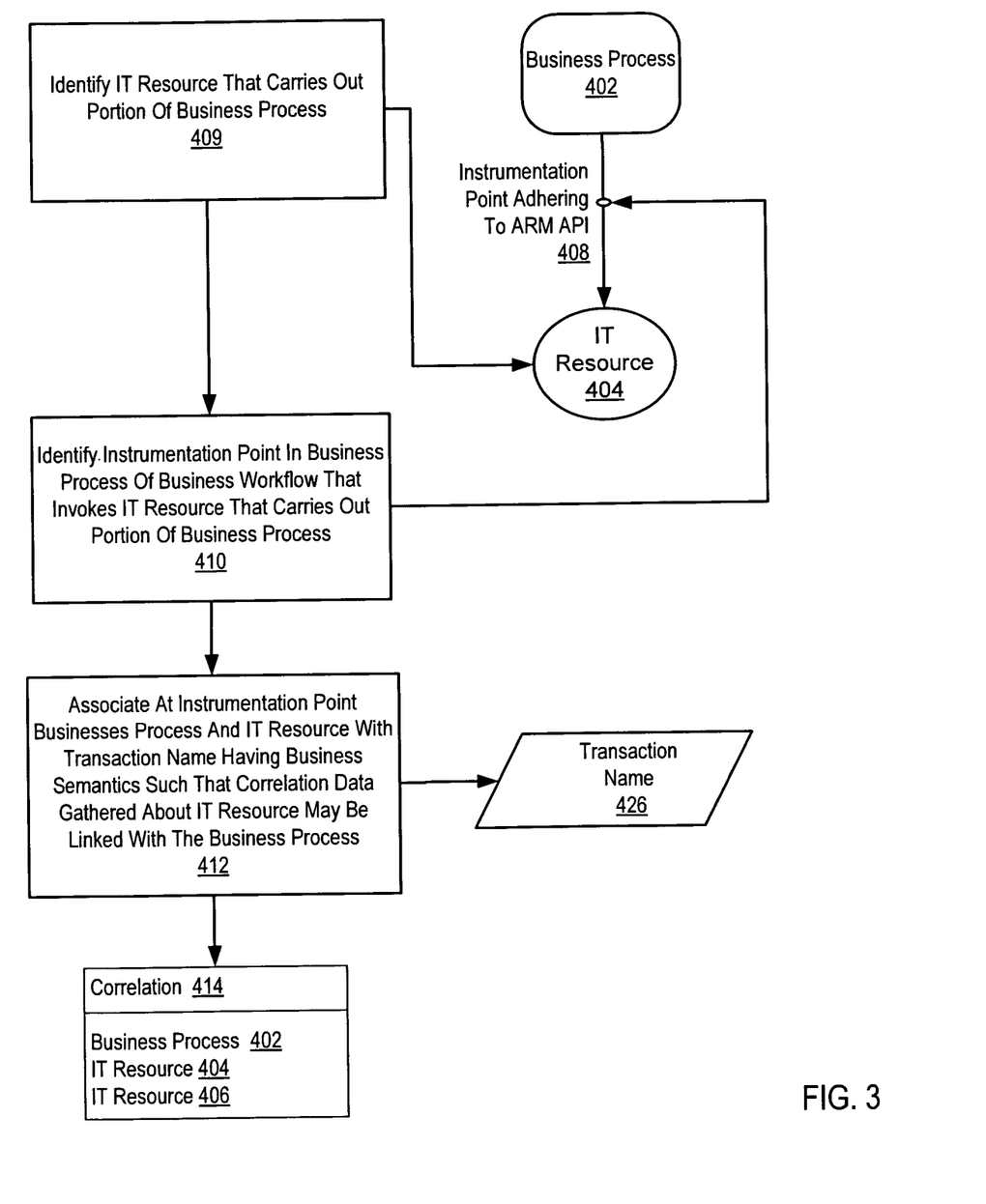
FIG. 3 sets forth a flow chart illustrating an exemplary method for correlating business workflows with transaction tracking according to embodiments of the present invention.

For further explanation, FIG. 3 sets forth a flow chart illustrating an exemplary method for correlating business workflows with transaction tracking according to embodiments of the present invention that includes providing (405) a means to identify an instrumentation point (408) in a business process (402) of a business workflow that invokes an IT resource (404, 406) that carries out at least a portion of the business process (402). Means to identify an instrumentation point in a business process are typically implemented as software tools designed to aid a user in identifying an instrumentation point in a business process as discussed in more detail below. In some cases, such software tools are implemented as part of a business process engine.

The method of FIG. 3 also includes identifying (409) an IT resource (404) that carries out at least a portion of a business process (402). As discussed above, IT resources carry out one or more of the processes that implement a business method such as for example, calls to databases, requests for web services, the execution of web services, server-side processes, and so on as will occur to those of skill in the art. One way of identifying (409) an IT resource (404) according to the method of FIG. 3 therefore includes identifying in business process calls to IT resources. Often IT resources, such as for example EJBs, are machine generated and are given names according to formatting parameters. Identifying in business process calls to IT resources therefore may be carried out by identifying calls to the resources having names of a particular form known to be given to IT resources.

The method of FIG. 3 also includes identifying (410) an instrumentation point (408) in a business process (402) of a business workflow that invokes an IT resource (404, 406) that carries out at least a portion of the business process (402). An instrumentation point is a place in the code of either the business process of the IT resource that includes a call to a routine for gathering information about the performance of the code, such as for example, a call to the ARM API. Such calls may include a call to create a data structure to represent an application, a call to create a data structure to represent a transaction, a call to start timing the transaction, and a call to stop timing the transaction. As discussed in more detail below with reference to FIGS. 4 and 5, identifying (410) an instrumentation point (408) in a business process (402) of a business workflow that invokes an IT resource (404, 406) that carries out at least a portion of the business process (402) may be carried out by selecting a new instrumentation point in a business process or by selecting an existing instrumentation point in a business process.

In the method of FIG. 3, the code for the instrumentation point (408) adheres to the Application Response Measurement ('ARM') application programming interface ('API'). ARM is an industry standard for tracking the performance of programs. ARM commands include commands in Java or C initiate an application, to create a transaction ID, to start and stop monitoring transactions, and to end all monitoring. ARM provides for the correlating the information of transactions by passing a data structure called a correlator from a parent transaction to a child transaction. ARM uses the data to create a data structure that represents the relationships of the transactions being monitored. The data produced by the ARM API can be collected by management software for use in displaying information about the transactions monitored.

The method of FIG. 3 also includes associating (412), at the instrumentation point (408), the business process (402) and the IT resource (404) with a transaction name (426) having business semantics such that correlation data (414) gathered about the IT resource (404) may be linked with the business process (402). Associating, at the instrumentation point, the business process and the IT resource with a transaction name having business semantics such that correlation data gathered about the IT resource may be linked with the business process may be carried out by naming a transaction with a transaction name having business semantics or renaming a transaction with a transaction name having business semantics as discussed in more detail below with reference to FIGS. 4 and 5. A transaction name having business semantics typically includes one or more aspects of the name that identifies the business process implemented by the execution of the IT resource.

The correlation data (414) gathered about an IT resource is data describing aspects of the execution of the IT resource. Correlation data may show the time expired during the execution of IT resource and the business process that it carried out at least a portion of. In the example of FIG. 3, correlation data is represented as correlation record (414). The correlation record (414) of FIG. 3 includes the name of a business process (402) and the names of the IT resources (404 and 406) that carried out at least a portion of the business process (402).

Figure 4:
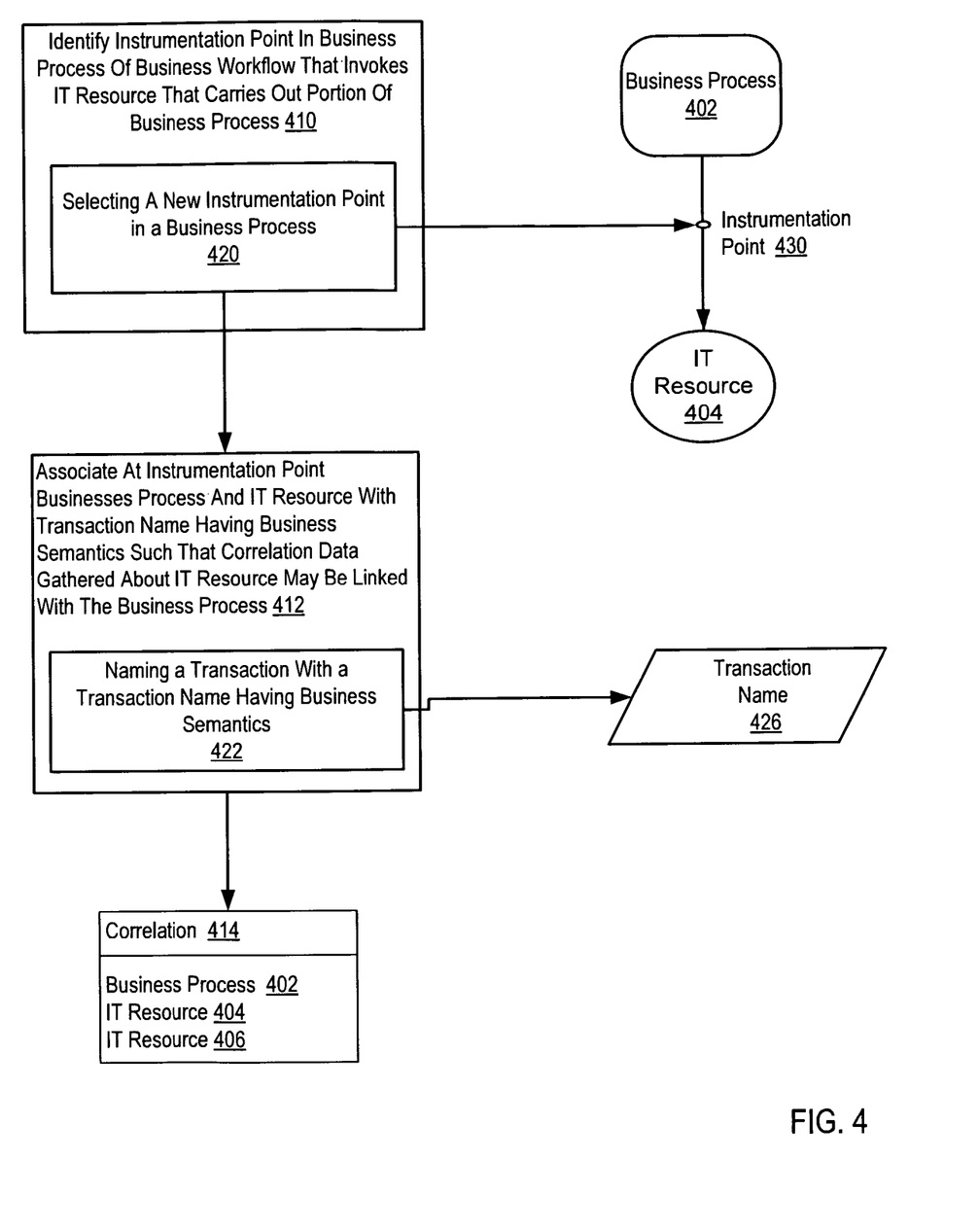
FIG. 4 sets forth a flow chart illustrating a further exemplary method for correlating business workflows with transaction tracking according to embodiments of the present invention.

As discussed above, identifying instrumentation points in business processes that invoke an IT resource may include selecting a new instrumentation point in a business process. For further explanation therefore, FIG. 4 sets forth a flow chart illustrating a further exemplary method for correlating business workflows with transaction tracking according to embodiments of the present invention. In the method of FIG. 4, identifying (410) an instrumentation point (430) in a business process (402) of a business workflow that invokes an IT resource (404, 406) that carries out at least a portion of the business process (402) includes selecting (420) a new instrumentation point (430) in a business process (402). As discussed above, many embodiments of the present invention include providing means to identify an instrumentation point in a business process of a business workflow that invokes an IT resource that carries out at least a portion of the business process. Such means to identify an instrumentation point in a business process may include means to selecting a new instrumentation point (430) in a business process (402) which are typically implemented as software tools designed to aid a user in selecting a new instrumentation point in a business process as discussed in more detail below. In some cases, such software tools are implemented as part of a business process engine.

Selecting (420) a new instrumentation point (430) in a business process (402) may be carried out by identifying a call to invocation interfaces in a Web Services Invocation Framework ('WSIF') client. WSIF is a toolkit that provides an API for linking IT resources with abstracted business processes, such as those written for example in Business Process Execution Language ('BPEL'). BPEL is a standard, portable language for assembling legacy systems into end-to-end business processes under the Service Oriented Architecture ('SOA') framework. While BPEL typically invokes IT resources exposed as Web services, BPEL can be used with other IT resources. In such cases, the IT resources exposed to the BPEL process are described using the Web Services Description Language ('WSDL').

Figure 5:
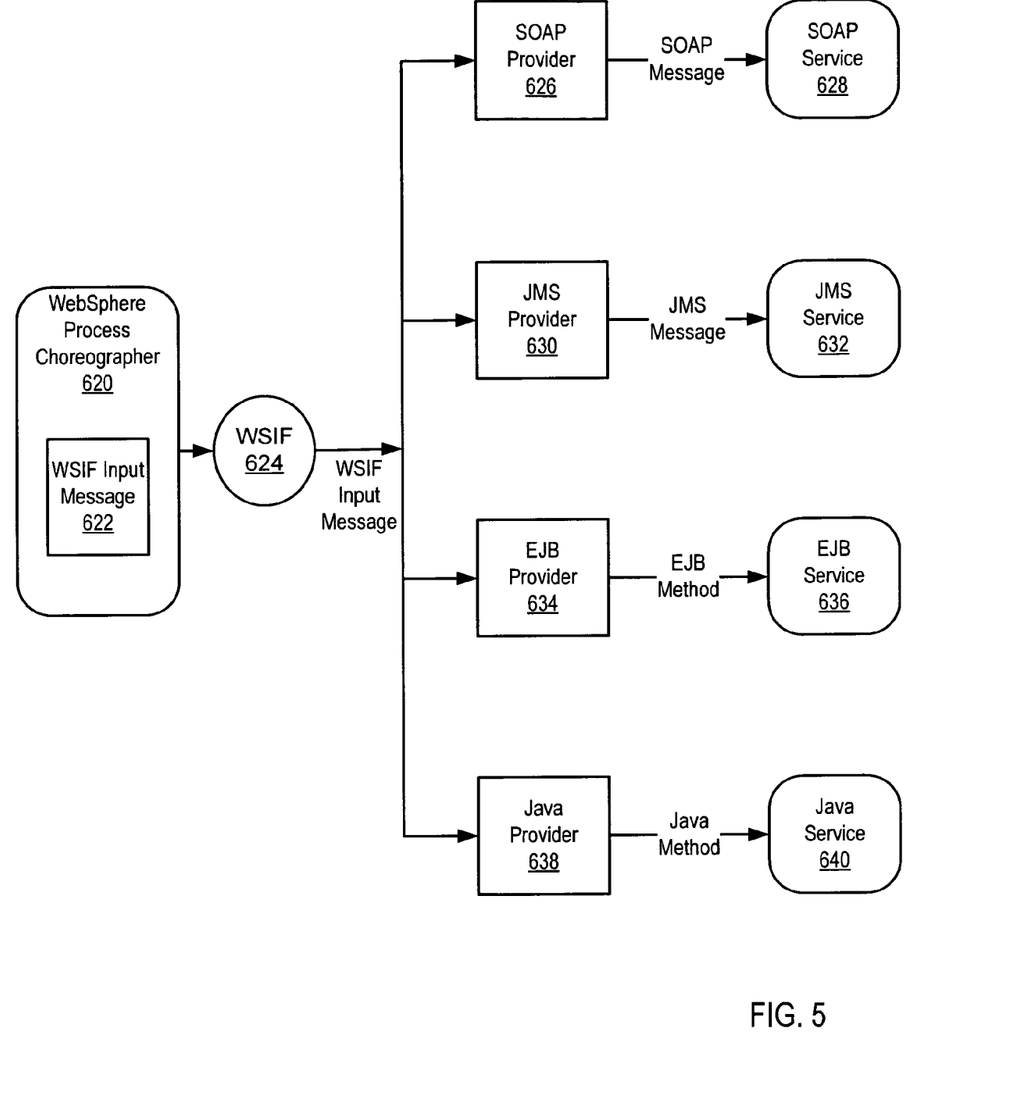
FIG. 5 sets forth a process flow chart illustrating an exemplary WSIF client that uses exemplary WSIF providers to access exemplary IT resources.

WSIF makes use of WSIF providers to support the specific protocol to access the resource. For further explanation, FIG. 5 sets forth a process flow chart illustrating a WSIF client (624) that uses WSIF providers (626, 630, 634, and 638) to access IT resources (628, 632, 636, 640). The example of FIG. 5 includes a WebSphere Process Choreographer (620). WebSphere Process Choreographer (620) is a program for converting business process descriptions into calls to IT resources to carry out the business processes ('business process engine'). In the example of FIG. 5, the WebSphere Process Choreographer (620) generates an input message (622) to WSIF client (624) to call an IT resource through an appropriate WSIF provider (626, 630, 634, 638).

The WSIF client (624) delivers the WSIF Input Message (622) to an appropriate WSIF service provider. The delivery of the WSIF input Message (622) to the service provider invokes an IT resource managed by the service provider capable of invoking the IT resource according to the appropriate protocol. In the example of FIG. 5, the SOAP provider (626) can invoke a SOAP Service (628) through a SOAP message.

The JMS provider (630) of FIG. 5 invokes a JMS service (632) through a JMS message. The EJB provider (634) of FIG. 5 invokes an EJB service (636) through an EJB method. The Java Provider (638) of FIG. 5 invokes a Java service (640) through a Java method.

Each of the IT resources (628, 632, 636, and 640) invoked in the example of FIG. 5 through the appropriate WSIF provider (626, 630, 634, and 638) may be called in the business method by calling one or more invocation interfaces. An invocation interface is the interface in the WSIF API for calling a resource. Examples of invocation interfaces supported by typical WSIF clients include:

executeRequestResponseOperation;
executeRequestResponseAsync;
fireAsyncResponse;
processAsyncResponse; and
executeInputOnlyOperation.

Each time one or more of these invocation interface methods are called, an IT resource is invoked through one or more WSIF providers. Therefore, these invocation interface methods provide an ideal place for selecting instrumentation points.

Again with reference to FIG. 4: As just discussed, invocation interface methods provide an ideal place for selecting instrumentation points for correlating business workflows with transaction tracking according to embodiments of the present invention. Selecting (420) a new instrumentation point (430) in a business process (402) may be carried out by identifying a call to invocation interfaces in a Web Services Invocation Framework ('WSIF') client and inserting a new instrumentation point. The instrumentation point may be implemented as Java method calls to the ARM API.

After selecting a new instrumentation point in the business process, the method of FIG. 4 continues by associating (412), at new instrumentation point (430), the business process (402) and the IT resource (404) with a transaction name (426) having business semantics such that correlation data gathered about the IT resource (404) may be linked with the business process (402). In the example of FIG. 4, associating (412), at new instrumentation point (430), the business process (402) and the IT resource (404) with a transaction name (426) having business semantics such that correlation data gathered about the IT resource (404) may be linked with the business process (402) includes naming (422) a transaction with a transaction name (426) having business semantics. Naming (422) a transaction with a transaction name (426) having business semantics may be carried out by providing a name to transactions that call IT resources that describes one or more aspects of the business processes or subprocesses it supports. Components of the name, for example, may describe the type of business process, the name of the process, a unique identifier for the transaction and so on as will occur to those of skill in the art.

Identifying a new instrumentation point and naming transactions at the new instrumentation point with a transaction name having business semantics advantageously provides a vehicle to correlate business workflows with transaction tracking such that correlation data gathered about IT resources invoked by the business process may be linked with the IT resources' associated business processes. As such, business users are provided with increased information about the run-time performance of those users' business processes.

Figure 6:
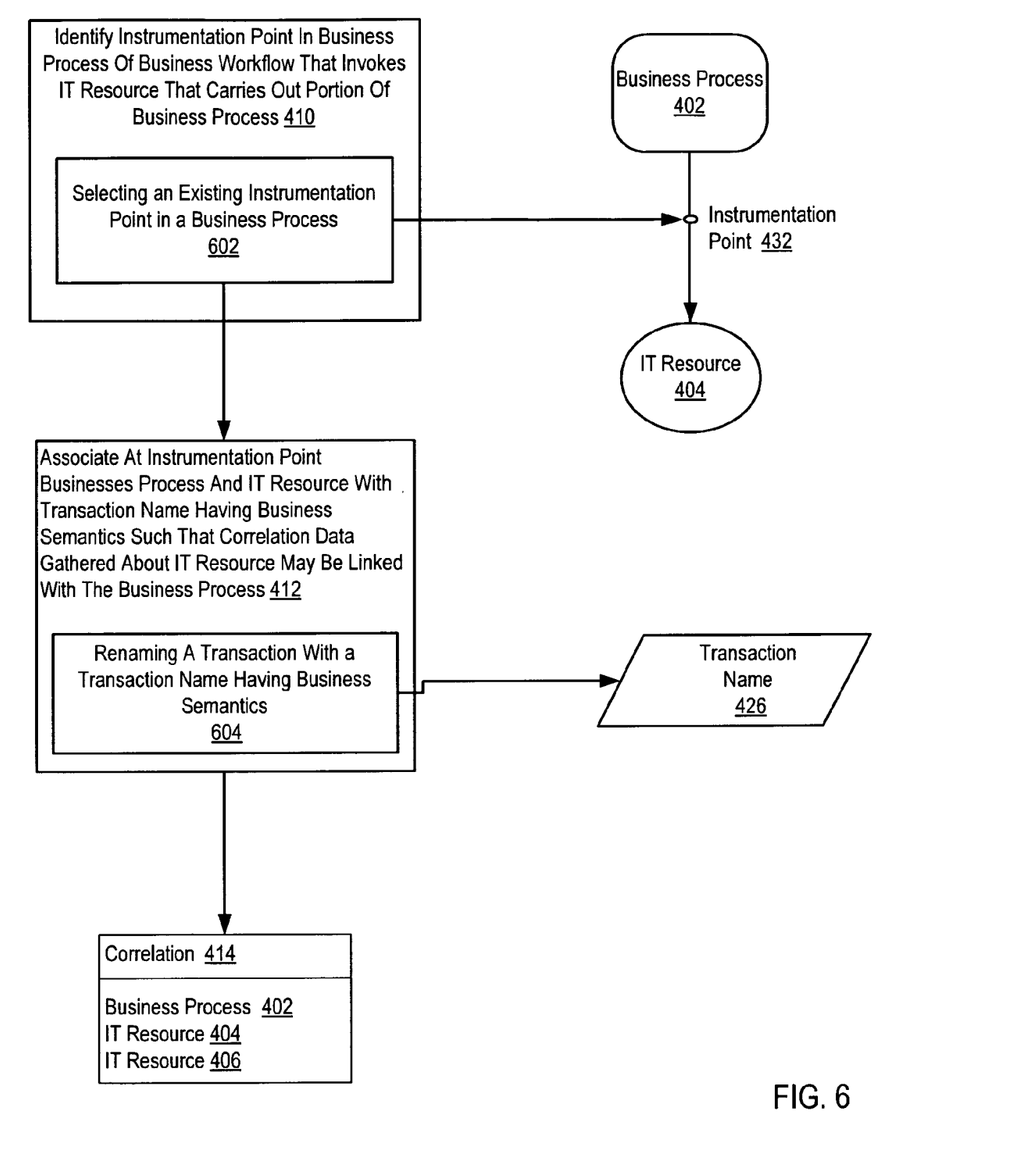
FIG. 6 sets forth a flow chart illustrating a further exemplary method for correlating business workflows with transaction tracking according to embodiments of the present invention.

In addition to identifying new instrumentation points in business processes that invoke an IT resource and naming transactions at the new instrumentation points with transaction names having business semantics as just discussed with reference to FIGS. 4 and 5, correlating business workflows with transaction tracking according to embodiments of the present invention may also include identifying existing instrumentation points in a business process and renaming transactions at those existing instrumentation points with transaction names that also have business semantics. For further explanation therefore, FIG. 6 sets forth a flow chart illustrating a further exemplary method for correlating business workflows with transaction tracking according to embodiments of the present invention. The method of FIG. 6 includes identifying (410) an instrumentation point (432) in a business process (402) of a business workflow that invokes an IT resource (404, 406) that carries out at least a portion of the business process (402). In the method of FIG. 6, however, identifying (410) an instrumentation point (432) in a business process (402) of a business workflow that invokes an IT resource (404, 406) that carries out at least a portion of the business process (402) includes selecting (602) an existing instrumentation point (432) in a business process (402). As discussed above, many embodiments of the present invention include providing means to identify an instrumentation point in a business process of a business workflow that invokes an IT resource that carries out at least a portion of the business process. Such means to identify an instrumentation point in a business process may include means to selecting an existing instrumentation point in a business process which are typically implemented as software tools designed to aid a user in selecting an existing instrumentation point in a business process as discussed in more detail below. In some cases, such software tools are implemented as part of a business process engine.

Selecting an existing instrumentation point in a business process may be carried out by tracing transactions from the business processes to the IT resources that carry out the business processes to determine the actual IT resources that carry out the business processes. Selecting (602) an existing instrumentation point (432) in a business process (402) therefore may include identifying an existing instrumentation point in an already instrumented IT resource determined to actually carry out a business process.

Having selected an existing instrumentation point, the method of FIG. 6 continues by associating (412), at the existing instrumentation point, the business process (402) and the IT resource (404) with a transaction name (426) having business semantics such that correlation data gathered about the IT resource (404) may be linked with the business process (402). In the method of FIG. 6, associating (412), at the instrumentation point (432), the business process (402) and the IT resource (404) with a transaction name (426) having business semantics such that correlation data gathered about the IT resource (404) may be linked with the business process (402) includes renaming (604) a transaction with a transaction name (426) having business semantics. Renaming (604) a transaction with a transaction name having business semantics may be carried out by providing a name to transactions that execute the IT resources that describes one or more aspects of the business processes or subprocesses it supports. Components of the name, for example, may describe the type of business process, the name of the process, a unique identifier for the transaction and so on as will occur to those of skill in the art.

Identifying an existing instrumentation point and renaming transactions at the new instrumentation point with a transaction name having business semantics advantageously provides a vehicle to correlate business workflows with transaction tracking such that correlation data gathered about IT resources invoked by the business process may be linked with the IT resources' associated business processes. As such, business users are provided with increased information about the run-time performance of those users' business processes.

Correlating business workflows with transaction tracking as described above provide a vehicle for transaction tracking such that correlation data gathered about IT resources invoked by the business process may be linked with the IT resources' associated business processes through appropriately named transactions. IT resources are linked with associated business process at runtime. Transaction monitoring is carried out by passing a correlator at each instrumentation point and gathering data about the transaction with the passing of the correlator. Management software may then be used to display information about the transactions. One specific transaction monitoring API is the ARM API. ARM is an industry standard for tracking the performance of programs. ARM commands include commands in Java or C initiate an application, to create a transaction ID, to start and stop monitoring transactions, and to end all monitoring. ARM provides for the correlating the information of transactions by passing a data structure called a correlator from a parent transaction to a child transaction. ARM uses the data to create a data structure that represents the relationships of the transactions being monitored. The data produced by the ARM API can be collected by management software for use in displaying information about the transactions monitored.

Passing correlators from business processes to the IT resources carrying out the business processes often invoke the use of many different protocols. Correlating business workflows with transaction tracking according to the present invention therefore provides a vehicle for correlator passing that may be used across various protocols of IT resources invoked by business processes. For further explanation, therefore FIG. 7 sets forth a flow chart illustrating run-time aspects of correlating business workflows with transaction tracking according to embodiments of the present invention. The method of FIG. 7 includes providing (708) for plural protocol correlator passing. Providing (708) for plural protocol correlator passing typically includes providing for the ability to pass a correlator by a plurality of protocols in dependence upon one or more of the entities receiving a correlator while transaction tracking according to embodiments of the present invention. As discussed above, a correlator is a data structure used to pass information from a one transaction to another for use in tracking and monitoring performance of transactions. Various transactions may pass correlators using various protocols. For example, a correlator may be passed in a transaction invoked through a SOAP message using a different correlator passing protocol than a transaction invoked through an EJB. The method of FIG. 7 therefore provides for plural protocol correlator passing by making available at the interface between business processes and IT resources invoked by those business processes a plurality of service specific correlator passing methods specifically designed to pass a correlator according to the specific resource invoked by the transaction and the specific protocol required to pass the correlator. As discussed above, with reference to FIG. 5, WSIF provides a WSIF client to call an IT resource through an appropriate WSIF provider. Calling an IT resource through an appropriate WSIF provider may require the use of a specific protocol for passing a correlator from the WSIF client to the appropriate WSIF provider. Such a WSIF client is therefore equipped with a plurality of service specific correlator passing methods enabling the WSIF client to pass a correlator to the appropriate WSIF provider using the proper protocol.

Figure 7:
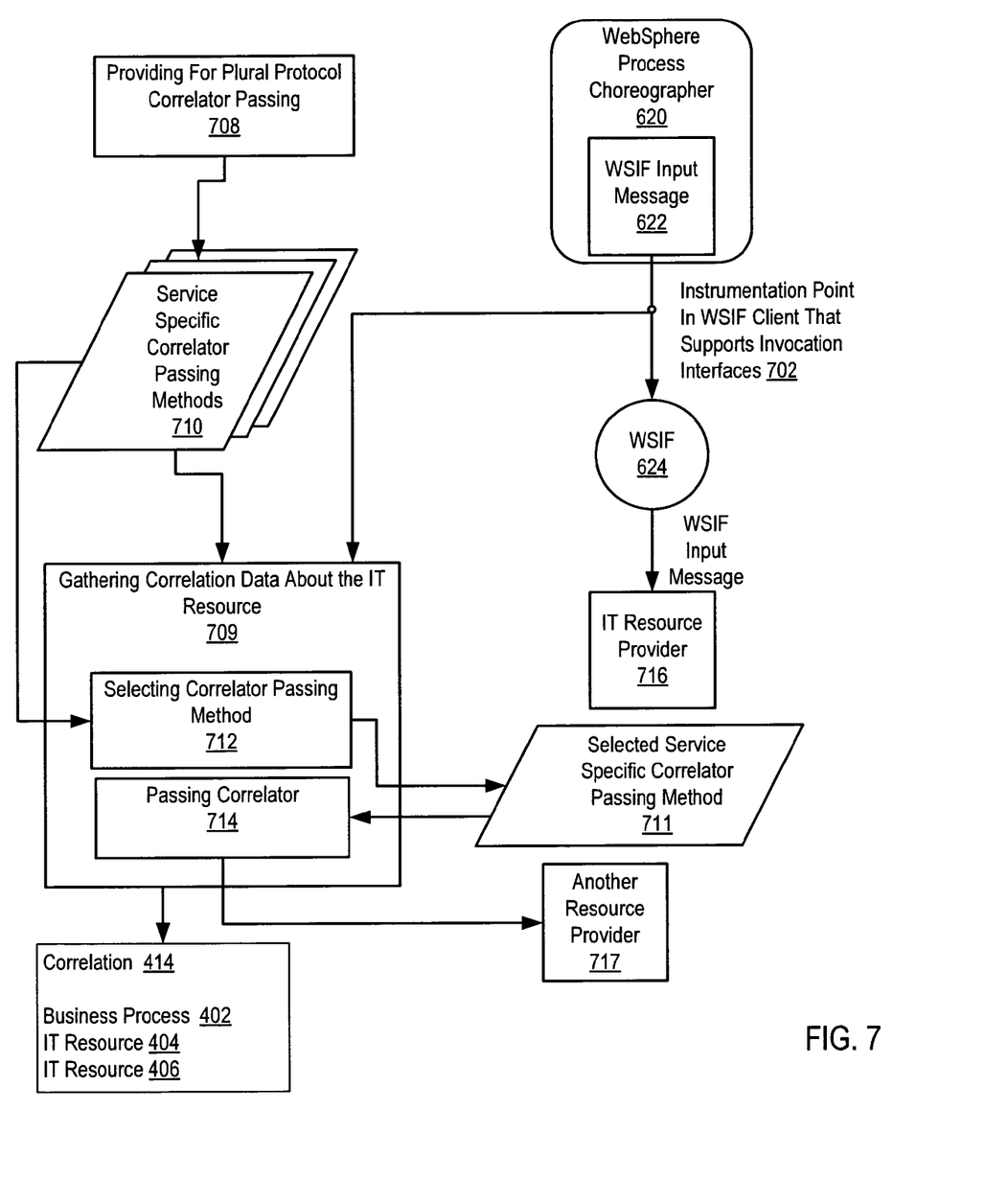
FIG. 7 sets forth a flow chart illustrating run-time aspects of correlating business workflows with transaction tracking according to embodiments of the present invention.

The method of FIG. 7 includes gathering (709) correlation data (414) about the IT resource (716) including calling at instrumentation point (702) in a WSIF client (624) an invocation interface method. The method of FIG. 7 also includes selecting (712) one of the plurality of service specific correlator passing methods (711). Selecting (712) a correlator passing method may be carried out by calling an invocation method that has inserted after the invocation method a dummy instrumentation point. The return from the invocation method call indicates the protocol used to communicate with the resource selected by the invocation method. That protocol information can be used to select the appropriate service specific correlator passing method.

The method of FIG. 7 also includes passing a correlator (714) in accordance with the selected service specific correlator passing method (711). Passing a correlator (714) in accordance with the selected service specific correlator passing method (711) advantageously provides for passing the correlator to each several specific service providers in a format understandable by the specific service provider.

One example of passing a correlator in accordance with the selected service specific correlator passing method is carried out by the following exemplary command:

WSIFMessage.setObjectPart(WSIFConstants.CONTEXT_REQUEST_SOAP_HEADER, (List) headers);

Using this command, a WSIF client may pass the correlator to SOAP providers via the SOAP header.

Another example of passing a correlator in accordance with the selected service specific correlator passing method is carried out by the following exemplary command:

WSIFMessage.setObjectPart(WSIFConstants.CONTEXT_JMS_PREFIX+APP_DEFINED_KEY, (Object) Correlation_ID);

Using this command, a WSIF client may pass the correlator ID as part of the JMS message payload to a JMS provider.

Still another way of passing a correlator in accordance with the selected service specific correlator passing method is carried out by passing the correlator ID via the Java Thread Local Storage to an EJB or Java provider.

The examples of service specific correlator passing methods are provided for explanation and not for limitation. In fact, many service specific correlator passing methods may be useful in correlating business workflows with transaction tracking and all such methods are well within the scope of the present invention.

In the method of FIG. 7, the correlation data gathered at the instrumentation point about the IT resource further comprises correlation data gathered by calling the invocation interfaces. Calling the invocation interfaces may be carried out by making a call from a business process engine to WSIF to invoke an IT resource or web service.

Having linked through a transaction name having business semantics the business processes and the IT resources carrying out those business processes it is advantageous to provide correlation data generated by transaction tracking to the user. For further explanation, FIG. 8 sets forth a flow chart illustrating a further exemplary method for correlating business workflows with transaction tracking according to embodiments of the present invention that includes providing (802) to a user (808) through a user interface (806) correlation data for the IT resource in association with a name having business semantics. Providing (802) to a user (808) through a user interface (806) correlation data for the IT resource in association with a name having business semantics advantageously provides to business users transaction tracking that is tightly coupled to the business processes that those business users are typically most interested in.

Figure 8:
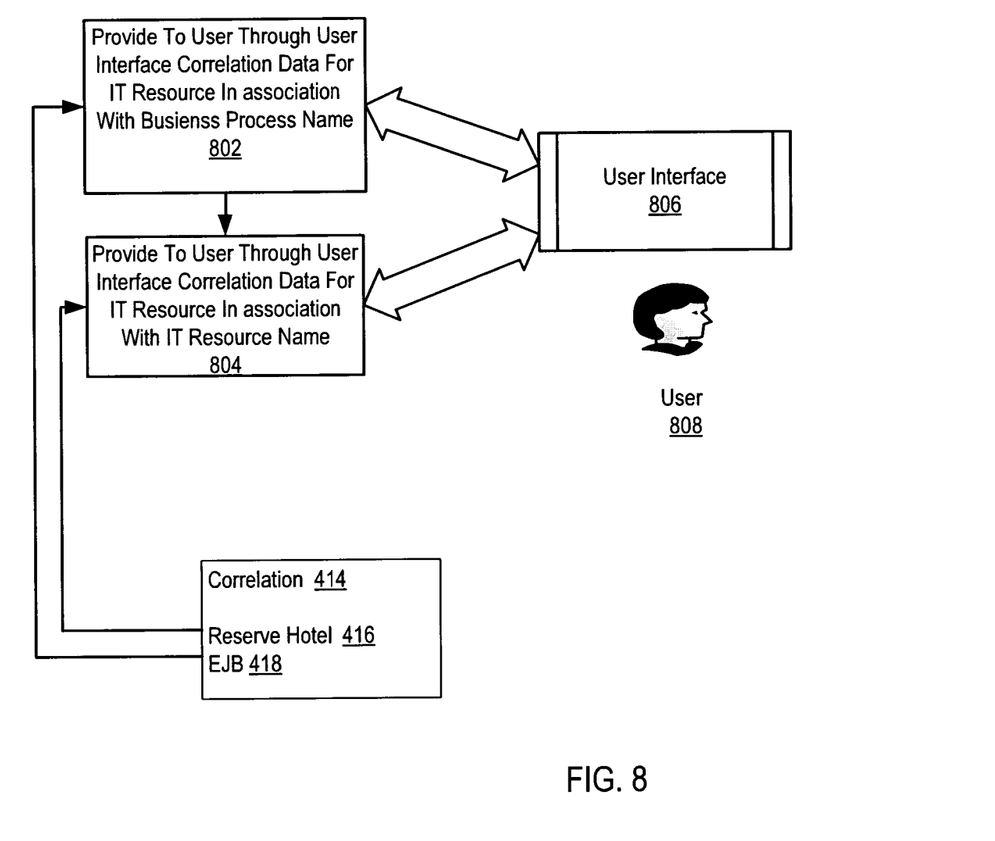
FIG. 8 sets forth a flow chart illustrating a further exemplary method for correlating business workflows with transaction tracking according to embodiments of the present invention.

The method of FIG. 8 also includes providing (804) to a user (808) through a user interface (806) correlation data for the IT resource in association with a name having semantics for the IT resource. Providing (804) to a user (808) through a user interface (806) correlation data for the IT resource in association with a name having semantics for the IT resource advantageously provides to IT users transaction tracking tightly coupled to the IT processes carrying out business functions that IT users are typically most interested in.

Users may be empowered to alternate between correlation data for the IT resource presented in association with a name having business semantics and correlation data for the IT resource presented in association with a name having semantics for the IT resource through the use of switching mechanism in a user interface. Users may also be empowered to view both correlation data for the IT resource presented in association with a name having business semantics and correlation data for the IT resource presented in association with a name having semantics for the IT resource through the use of another display mechanism in a user interface. Such plural views advantageously provide for the display of correlation data to a wide range of users.

Exemplary embodiments of the present invention are described largely in the context of a fully functional computer system for correlating business workflows with transaction tracking. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer implemented method for correlating business workflows with transaction tracking by a computer, comprising:
    identifying, by the computer, an instrumentation point in a business process of a business workflow that invokes an IT resource that carries out at least a portion of the business process; and
    associating, by the computer at the instrumentation point, the business process and the IT resource with a transaction name having business semantics such that correlation data gathered about the IT resource is linked with the business process.

2. The method of claim 1 wherein identifying the instrumentation point includes selecting a new instrumentation point in the business process; and wherein associating the business process and the IT resource includes naming a transaction with the transaction name.

3. The method of claim 1 further comprising identifying the IT resource that carries out the at least a portion of the business process.

4. The method of claim 1, wherein the instrumentation point is in a Web Services Invocation Framework ('WSIF') client associated with an invocation interface.

5. The method of claim 4 further comprising gathering the correlation data about the IT resource, including:
    selecting one of a plurality of service specific correlator passing methods, wherein each one of the plurality of service specific correlator passing methods are operable to pass a given correlator according to (i) a specific resource invoked by a given transaction and (ii) a given protocol used to pass the given correlator; and
    passing a correlator in accordance with the selected service specific correlator passing method, wherein the correlator is a data structure used to pass information from one transaction to another for use in monitoring performance of transactions.

6. The method of claim 5, wherein gathering the correlation data comprises calling the invocation interface at the instrumentation point in the WSIF client.

7. The method of claim 1 further comprising providing the correlation data for the IT resource to a user through a user interface.

8. The method of claim 1 further comprising providing, to a user through a user interface, the correlation data for the IT resource in association with a name having semantics for the IT resource.

9. A system for correlating business workflows with transaction tracking, the system, comprising:
- a computer processor;
- a computer memory operatively coupled to the computer processor, the computer memory having disposed within it computer program instructions comprising:
- computer program instructions for identifying an instrumentation point in a business process of a business workflow that invokes an IT resource that carries out at least a portion of the business process; and
- computer program instructions for associating, at the instrumentation point, the business process and the IT resource with a transaction name having business semantics such that correlation data gathered about the IT resource is linked with the business process.

10. The system of claim 9 wherein the computer program instructions further comprise:
- computer program instructions for selecting a new instrumentation point in the business process; and
- computer program instructions for naming a transaction with the transaction name.

11. The system of claim 9 wherein the computer program instructions further comprise computer program instructions for identifying the IT resource that carries out the at least a portion of the business process.

12. The system of claim 9 wherein the instrumentation point is in a Web Services Invocation Framework ('WSIF') client associated with an invocation interface.

13. The system of claim 12 wherein the computer program instructions for gathering the correlation data include:
- computer program instructions for selecting one of a plurality of service specific correlator passing systems, wherein each one of the plurality of service specific correlator passing methods are operable to pass a given correlator according to (i) a specific resource invoked by a given transaction and (ii) a given protocol used to pass the given correlator; and
- computer program instructions for passing a correlator in accordance with the selected service specific correlator passing system, wherein the correlator is a data structure used to pass information from one transaction to another for use in monitoring performance of transactions.

14. The system of claim 13 wherein the computer program instructions further comprise computer program instructions for calling the invocation interface at the instrumentation point in the WSIF client.

15. The system of claim 9 wherein the computer program instructions further comprise computer program instructions for providing the correlation data for the IT resource to a user through a user interface.

16. The system of claim 9 wherein the computer program instructions further comprise computer program instructions for providing, to a user through a user interface, the correlation data for the IT resource in association with a name having semantics for the IT resource.

* * * * *